(No Model.)
F. SELTSAM.
EXTRACTING OIL AND GLUE FROM BONES, &c.
No. 308,436. Patented Nov. 25, 1884.
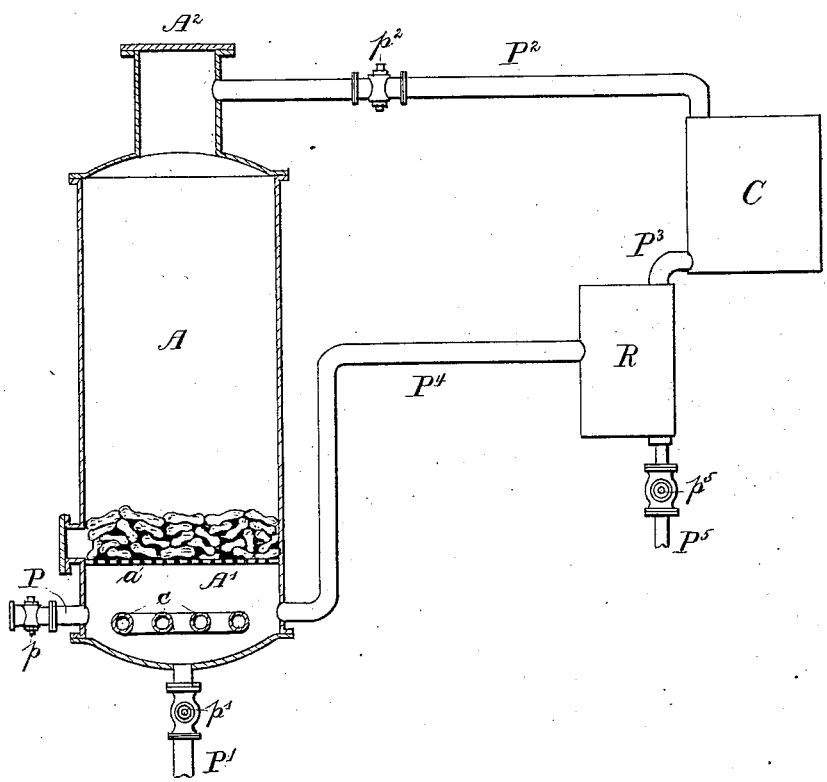
Witnesses:—
Inventor:
Friedrich Seltsam

UNITED STATES PATENT OFFICE.

FRIEDRICH SELTSAM, OF FORCHHEIM, BAVARIA, GERMANY.

EXTRACTING OIL AND GLUE FROM BONES, &c.

SPECIFICATION forming part of Letters Patent No. 308,436, dated November 25, 1884.

Application filed July 23, 1884. (No specimens.) Patented in Belgium July 16, 1884, No. 65,788; in England July 16, 1884, No. 10,208, and in Italy August 11, 1884, XXXIV, 94.

*To all whom it may concern:*

Be it known that I, FRIEDRICH SELTSAM, a subject of the King of Bavaria, residing at Forchheim, Bavaria, German Empire, have invented certain new and useful Improvements in the Process of Extracting Oil and Glue from Bones and the like; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to a novel process of preparing bones and other fatty substances in the manufacture of glue or for other purposes. In the usual treatment of bones in the manufacture of glue by means of benzine to extract the fatty constituents therefrom it is necessary to subject the bones to a process of desiccation after the elimination of the fat in order to eliminate the remaining aqueous constituents. It is also well known that the removal of all the fat from bones by repeated lixiviation in or with fluid benzine is not possible, for the reason that the aqueous constituents remaining in the bones mechanically retain some of the fat and prevent their thorough permeation by the benzine.

According to my invention I combine the desiccating or drying process of the bones with that of eliminating the fatty constituents therefrom by employing fat solvents the boiling-point of which is above 100° centigrade, and by proceeding in such manner that the heat evolved from the fluid or gaseous solvent will convert the aqueous constituents of the bones into steam while the fatty constituents are eliminated or extracted therefrom. This process may be carried out in any of the usual extracting apparatuses, or in any suitably-constructed extracting apparatus.

In the accompanying drawing I have shown in sectional elevation an apparatus which will answer all the purposes.

A is the extracting-vessel provided with a perforated false bottom, $a$, into which vessel the bones are charged. In the chamber A', below the false bottom $a$, is arranged a heating-coil, $c$, to which steam is admitted from any suitable generator.

P is a pipe that is provided with a suitable stop-cock, $p$, and connected with a solvent reservoir (not shown) and with the chamber A', for feeding a solvent thereto, which is evaporated by the heat from coil $c$. The chamber A' has a discharge-pipe, P', provided with a stop-cock, $p'$, for discharging the fat. The vessel A has at its upper end a charging and discharging orifice, $A^2$, through which the bones are introduced for and removed after treatment, said orifice being closed by a suitable lid or gate during the treatment of the bones, and it is connected at that point by a pipe, $P^2$, provided with a valve or stop-cock, $p^2$, with a condenser, C, in which the solvent and aqueous vapors that escape from vessel A are condensed. The condenser C is connected by a pipe, $P^3$, with a receiver, R, for receiving the products of condensation, and said receiver R is connected by a pipe, $P^4$, with chamber A', for conducting the condensed solvent back to said chamber.

It will be observed that the pipe $P^4$ is connected with the receiver R at a point some distance above its bottom, and as the solvent is of considerable less specific gravity than the condensed aqueous vapors evaporated from the bones and carried over with the solvent vapors, said solvent can be carried back to chamber A' without carrying over any of the water in receiver R, which water may be removed from the receiver from time to time through a pipe, $P^5$, provided with a suitable stop-cock, $p^5$. I employ as solvent the fluid products of the distillation of hydrocarbons—such as petroleum, naphtha, or hydrocarbon containing materials, such as bituminous coal, &c.—the boiling-point of which is above 100° centigrade. Those commercial products that contain hydrocarbon the boiling-point of which is below 100° centigrade are subjected to fractional distillation before use in the treatment of bones according to my process to free the same from hydrocarbon constituents the boiling-point of which is below 100° centigrade.

The operation is as follows: After introducing a sufficient quantity of fluid solvent into the bone-charged extracting-vessel A the stop cock $p$ or feed-pipe P is closed and steam under pressure is admitted to coil $c$ to heat the solvent. The gases generated from the solvent rise through the charge of bones and are in part condensed in the lower strata thereof and heat the same and extract their fatty constituents. This process of heating gradually increases, spreading through the entire mass of bones until the temperature rises to 100° centigrade. When this temperature is reached, the aqueous constituents of the bones are converted into steam, which escapes through the charge of bones with the solvent vapors, the steam and vapors passing from vessel A, through pipe $P^2$ (the stop-cock $p^2$ having previously been opened) to the condenser C, where said vapors and steam are condensed and allowed to flow into the receiver R, from which the lighter hydrocarbon solvent is carried back to the chamber A' of vessel A, as above set forth. It will be observed that the heat necessary to the conversion into steam of the aqueous constituents of the bones is derived from the vapors or gases generated from the solvent, which results in its condensation and simultaneous solution of the fatty constituents of the bones. In this condensation by the usual method of extracting fat from the bones only the heat for heating the bones was utilized to condense the vapors, and as this heat is entirely inadequate it became necessary to provide means for condensing said vapors—such as water-jackets or a water-circulation within the extracting-vessel, or by a partial condensation of the solvent by increased evaporation under reduced pressures, or by injection of cold benzine. These means are therefore entirely dispensed with by my new process, the proceeding as well as the apparatus being very materially simplified. The described operation is continued until all the aqueous constituents of the bones have been eliminated, when it will be found, as a rule, that all the fatty constituents have also been extracted. The solvent yet combined with or adhering to the bones is then eliminated as usual by means of steam under pressure, and since the temperature of the bones is above 100° centigrade a condensation of the steam cannot take place during this latter state of the treatment and the bones will be found completely dry, and may then be transferred to the comminuting-machine.

Bones treated as described contain, if any, but slight traces of fat, while by the old methods from one to two and a half per cent. of fat is found after treatment; nor is it necessary to comminute the bones before treatment, and they may therefore be charged into the extractor in the condition in which they reach the factory, because the conversion of the aqueous constituents of the bones into steam according to my mode of proceeding very materially assists the solvent in the extraction of the fat. As the bones leave the extracting-vessel in a thoroughly dry condition and free from both fat and moisture, they are more brittle, and may be reduced with greater facility and by the application of much less power. It is obvious that bones so treated are entirely free from sulphur and ammoniacal combinations on leaving the extractor; hence there is no inconvenience to the workmen or any offensive smell; and as these gases are condensed instead of being allowed to escape in the atmosphere during the process of treating the bones, as is generally the case, the neighborhood of the works is rendered less offensive in a sanitary point. My improved process offers, therefore, great advantages over the old methods. Nor are these the only advantages; but I claim that I obtain purer products both in fat and glue, the former containing little or no water and the latter no fatty substances, as will be readily understood.

It is obvious that other fatty materials may be treated by my process, and either under ordinary or higher or lower pressures.

Having thus described my said invention, what I claim, and desire to secure by Letters Patent, is—

The herein-described process of freeing bones and other fatty substances from fat and moisture by heating the same by means of a fluid fat solvent the boiling-point of which is not below 100° centigrade.

In testimony whereof I affix my signature in presence of two witnesses.

FRIEDRICH SELTSAM.

Witnesses:
  A. DEMELIUS,
  B. ROI.